(12) United States Patent  
Schafer

(10) Patent No.: US 7,089,749 B1
(45) Date of Patent: Aug. 15, 2006

(54) THERMOELECTRICALLY HEATED/COOLED CUPHOLDER SYSTEM

(75) Inventor: Chris Schafer, Long Beach, CA (US)

(73) Assignee: Robin Contino, Burlington, NC (US)

( * ) Notice: Subject to any disclaimer, the term of this patent is extended or adjusted under 35 U.S.C. 154(b) by 0 days.

(21) Appl. No.: 10/922,585

(22) Filed: Aug. 20, 2004

Related U.S. Application Data

(60) Provisional application No. 60/496,530, filed on Aug. 20, 2003.

(51) Int. Cl.
F25B 21/02 (2006.01)

(52) U.S. Cl. .......................................... 62/3.2; 62/3.64
(58) Field of Classification Search ................... 62/3.2, 62/3.3, 3.62, 3.64, 3.7
See application file for complete search history.

(56) References Cited

U.S. PATENT DOCUMENTS

| 2,991,628 | A | 7/1961 | Tuck |
| 3,839,876 | A | 10/1974 | Privas |
| 4,917,076 | A | 4/1990 | Nadolph et al. |
| 5,042,258 | A | 8/1991 | Sundhar |
| 5,111,664 | A | 5/1992 | Yang |
| 5,513,496 | A | 5/1996 | Stokes |
| 5,720,171 | A | 2/1998 | Osterhoff et al. |
| 5,823,380 | A | 10/1998 | Cox |
| 5,842,353 | A | 12/1998 | Kuo-Liang |
| 5,970,719 | A | 10/1999 | Merritt |
| 6,000,224 | A | 12/1999 | Foye |
| 6,141,969 | A | 11/2000 | Launchbury et al. |
| 6,141,975 | A | 11/2000 | Tatsumi |
| 6,530,232 | B1 * | 3/2003 | Kitchens .................. 62/3.3 |
| 6,637,709 | B1 * | 10/2003 | Guenther et al. ........ 248/311.2 |
| 6,640,551 | B1 * | 11/2003 | Slone et al. .............. 62/3.61 |

* cited by examiner

Primary Examiner—Melvin Jones
(74) Attorney, Agent, or Firm—The Harrington Practice PLLC

(57) ABSTRACT

A system for retaining and controlling the temperature of a beverage, suitable for installation in an automobile, includes a generally cylindrical, open-topped heat-conductive expandable cupholder, a heat-conductive liner, one or more thermoelectric devices located on a vertical exterior side of the cupholder, a heat sink contacting the thermoelectric device and thermally insulated from the cupholder; and a switch. The placement of the thermoelectric device and an improved arrangement for contact between the cupholder and the cup enable more efficient heat transfer.

16 Claims, 2 Drawing Sheets

THERMOELECTRICALLY HEATED/COOLED CUPHOLDER SYSTEM

CROSS-REFERENCE TO RELATED APPLICATIONS

This application claims the benefit of U.S. Provision Patent Application Ser. No. 60/496,530, filed Aug. 20, 2003, the entirety of which is incorporated herein by reference.

FIELD OF THE INVENTION

The present invention relates to a thermoelectrically heated and cooled cupholder system and more specifically to such a system wherein a finned Peltier device provides for heat transfer through efficient contact between the cup and the heat transfer surface.

BACKGROUND OF THE INVENTION

One of the principal drawbacks related to keeping beverages at their proper serving temperature is the tendency for such beverages to assume the ambient temperature in the environment into which they have been placed. A hot beverage, such as coffee or tea, particularly when served in an uninsulated cup, quickly cools. A cold beverage, such as an iced soda, quickly warms to room temperature, causing the ice to melt and dilute the beverage.

Various solutions to this problem have been proposed, which act passively to maintain the temperature of the beverage through some kind of insulation. For example, an insulated foam or fiberboard cozy can surround the beverage container, helping the container to retain its heat or to slow the infiltration of heat into a cold beverage. These passive systems slow the process of heat transfer, but they do not eliminate it or compensate for it entirely.

On the other hand, several active heat management systems have been developed, which for space and safety purposes make use of a Peltier or thermoelectric device. Such devices are well known in the art to which the present invention relates and consist essentially of a pair of ceramic plates separated by an array of cubes of bismuth telluride or a similar material. When a direct current is applied across the device, heat is moved from one side of the device to the other, producing a cooling effect on one side of the device. If the polarity of the current is reversed, the device becomes an efficient heater. Such devices are generally more efficient at cooling in combination with a heat sink, and because of the polarity-reversing feature of these devices, they are suitable for use where selective heating and cooling operations are desired.

For example, in U.S. Pat. No. 5,042,258, an insulated mug is provided with a heat-conductive bottom inner surface and a thermoelectric device in the base of the mug. The base of the mug is provided with heat-conductive fins, and the thermoelectric device, when energized, acts to heat or to cool the container, depending on the polarity of the current. In another example, in U.S. Pat. No. 6,141,969, a cupholder is provided with a thermoelectric device in a similar orientation, with a finned base and insulated sides.

One of the drawbacks of these designs is the orientation of the thermoelectric device—namely, at the bottom of the cup or cupholder. This orientation is presumably chosen for two reasons. First, in such an arrangement, the cup or the liquid can be reasonably guaranteed to be in physical contact with the thermoelectric device, which contact aids in the heat transfer as any air between the thermoelectric device and the cup or liquid acts as an insulator, reducing the efficiency. Second, because at least for cooling operations it is necessary to place fins against the heat sink, the ability to place the fins appropriately affects the arrangement of the device members.

However, the placement of the thermoelectric device at the bottom of the cup or holder poses the problem of uneven heating or cooling of the contents. Because the portion of the beverage next to be consumed is farthest away from the thermoelectric device, that portion receives very little benefit from the use of the device. Additionally, uneven heating of a hot beverage could cause the liquid at the bottom to become overheated, resulting in a burn injury to the drinker if the heat does not adequately diffuse through the liquid, or, at a minimum, an unpleasant taste if the beverage burns.

Moreover, the placement of the thermoelectric device at the bottom reduces the surface area of the contact between the cup or liquid and the heating or cooling surface. This surface area is further reduced because bottoms of beverage containers are rarely uniformly flat; most have bottoms that are shaped for efficient movement through a conveyor system or for stability. A greater heat-conductive surface area results in a more even and efficient cooling or heating process. When the thermoelectric device is oriented at the bottom of the container, the surface area of the contact is typically far smaller than the area of the non-heating, non-cooling surface.

Conventional cupholder systems also lack the ability to expand or contract to fit cups and containers of various sizes and profiles, such as cylindrical cans and frusto-conical coffee cups having pitched sides. Because these systems do not expand or contract to meet the cup size, they do not maintain solid, heat-conductive contact with the cup.

What is needed, then, is an active heat management system that makes use of thermoelectric technology more effectively than conventional systems, and that maintains better heat-conductive contact with the cup of liquid than conventional cupholder systems, particularly in the context of containers of varying sizes.

SUMMARY OF THE PRESENT INVENTION

Briefly summarized, the present invention includes a thermoelectrically heated and cooled cupholder system, ideally suited to placement in an automobile, in which the thermoelectric device or devices are placed on the sides of the cupholder so as to maximize the even dispersion of heat into or out of the cupholder. In an alternative embodiment, the cupholder is portable and self-contained.

The present invention generally includes an outer frame fabricated of plastic or other suitable material and provided with at least two sets of vents, one set for permitting air intake and the other for permitting air outflow. The interior of the outer frame contains a heat-conductive cupholder member and at least one two-sided thermoelectric device disposed on one of its sides on the side of the cupholder member. The thermoelectric device disposed on one of its sides on the side of the cupholder member. The thermoelectric device is provided with at least one fin, preferably fabricated from aluminum and disposed in heat-conductive contact with the other side of the thermoelectric device. A fan disposed beneath the cupholder is operative to move air through the interior of the outer frame as needed.

The cupholder member is formed as a number of sections that are cooperatively oriented to form a generally cylindrical shape. In order to allow for different cup sizes and profiles, the cupholder sections are mounted to the outer frame using a spring-loaded pin-in-groove system, such that the cupholder sections are free to slide to form a wider or narrower cylinder, or even to conform to conform to a non-cylindrical container (such as a cup having pitched sides), as needed. Each pin-in-groove is provided with a spring in order to maintain the cupholder member in the smallest circular profile allowed by the cup placed therein. This maintains pressure against the sides of the container for efficient heat transfer.

In a further feature of the present invention, an accordion-style liner is disposed on the inside of the cupholder member. This liner is preferably formed of heat-conductive rubber and is provided with a series of expansion and contraction folds that permit the liner to conform to the cupholder member regardless of the expansion or contraction thereof. The liner serves to prevent liquid, if spilled, from infiltrating the interior of the frame and causing damage to the parts contained therein.

The present is further provided with a direct-current electrical supply (for instance, through drawing current from a vehicle's electrical system in a vehicle-integrated embodiment) and with at least a three-position switch for activating and deactivating the device and specifying a heating or cooling operation. The invention is optionally provided with a variable resistor for specifying the amount of heating or cooling by varying the voltage directed through the thermoelectric devices, or with a thermostat for detecting the temperature of the container and activating or deactivating the device.

In an alternative embodiment, the present invention is embodied as a self-contained unit having features generally as described above. In such an embodiment, the invention may include its own battery power (in lieu of a vehicle-based power source) and may have a cup integrated into the system to allow drinking directly from a device according to the present invention.

BRIEF DESCRIPTION OF THE DRAWINGS

Further features, embodiments, and advantages of the present invention will become apparent from the following detailed description with reference to the drawings, wherein.

DETAILED DESCRIPTION OF THE PREFERRED EMBODIMENTS

Figure 1:
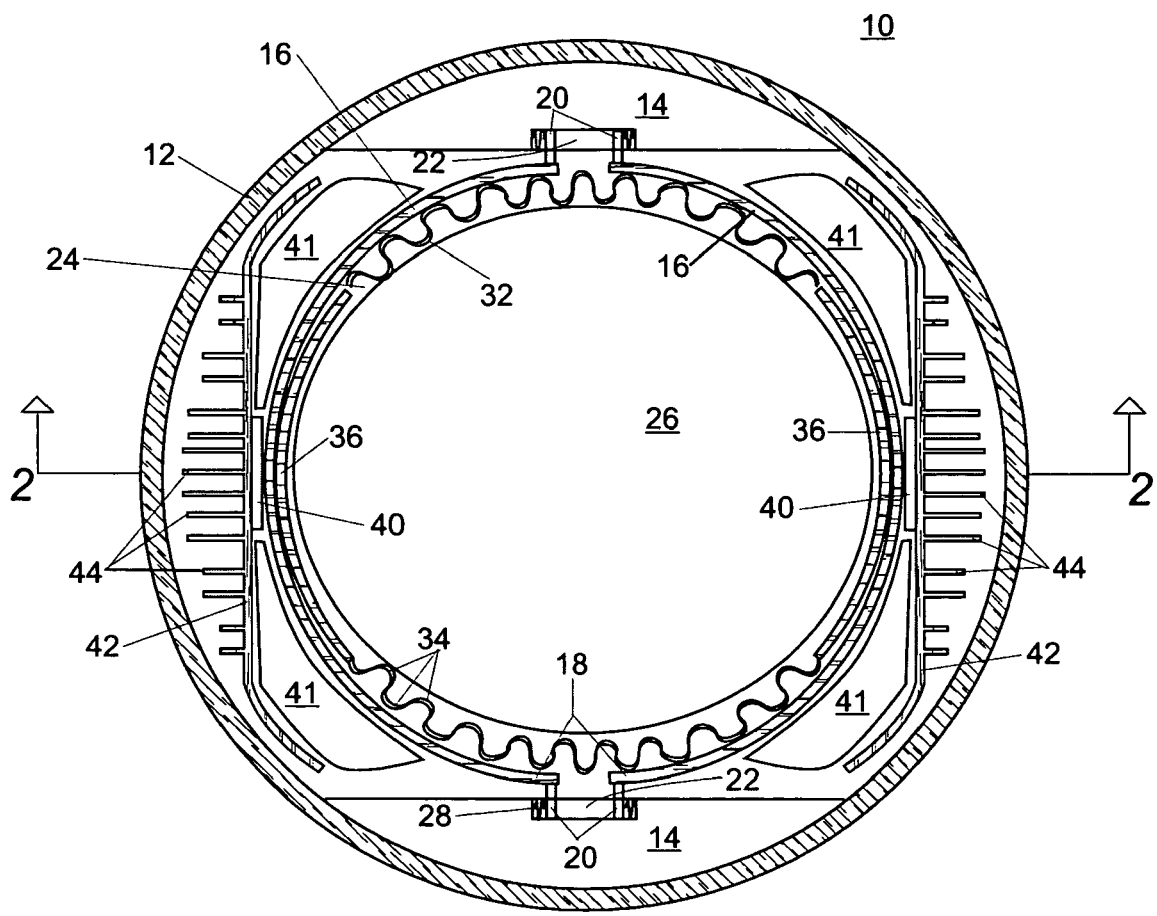
FIG. 1 is a plan view in partial cross-section of a device according to the present invention.

Referring now to the drawings, a thermoelectrically heated and cooled cupholder system 10 according to the present invention is shown in a plan view in partial cross-section in FIG. 1. Outer frame 12 is generally cup-shaped, i.e., generally cylindrical and open at the top thereof, and is ideally integrable with the console of an automobile (not shown), for instance. Outer frame 12 is ideally made of plastic or another similarly suitable material.

Outer frame 12 is provided on the interior thereof with a pair of mounting fixtures 14, which will be described in greater detail below in connection with an expansion feature of the invention. A pair of semi-cylindrical cupholder units 16 cooperate to form a generally cylindrical cupholder member 18. Cupholder member 18 is ideally made of a heat-conductive material such as aluminum or another metal suitable for conducting heat from or to substantially all of the surface area of cupholder member 18.

Each of the cupholder units 16 is mounted to the outer frame 12 via at least two pins 20 disposed within grooves 22 provided in the mounting fixtures 14. The grooves 22 are oriented so as to allow the pins 20 to slide therealong to expand or contract the interior space 24 of the cupholder member 18. This feature of the present invention permits the cupholder member 18 to assume a size that is substantially the same as a beverage container 26 placed inside the cupholder member 18.

In order to maintain the cupholder member 18 at the minimum size adequate to hold a selected container 26, each of the grooves 22 is provided with a spring 28 between a groove end 30 and the pin 20. Each spring 28 exerts a positive resistance force against expansion of the cupholder member 18, which allows the cupholder units 16 to maintain good face contact with the beverage container 26.

The interior of the cupholder member 18 is further provided with a heat-conductive liner 32 made of rubber or another appropriate material. The liner 32 is itself cup-shaped and is provided with a series of folds or reliefs 34 which allow the liner 32 to expand or contract together with the cupholder member 18. The reliefs 34 are shown in exaggerated detail in FIG. 1 in order to show their presence. The liner 32 acts to provide a substantially continuous surface within the interior space 24 of the cupholder member 18. Because of the split nature of cupholder 18, in the absence of a liner the split would allow any liquid spilled in the interior space 24 to drip into the outer frame 12, which could damage sensitive electronics or electrical or metal members of the device, or could at least create untidy or unhealthful conditions. Also, a rubber or plastic liner 32 has better gripping properties than does the cupholder member 18, because of a higher coefficient of friction between rubber or plastic and the metal, paper, or plastic surface of a beverage container 26. This makes the present invention surer in its ability to hold the beverage container 26 in place, particularly in an automobile application. In a preferred embodiment, the liner 32 is removable for easy cleaning.

An additional, optional feature of the present invention is a further cup-holding mechanism 36 disposed on the interior side of each of the cupholder units 16. The cup-holding mechanism 36 is ideally made of the same heat-conductive material as the liner 32 to allow it to conform to the shape of the container 26, but may be somewhat more rigid than the liner 32.

Until this point, the heating and cooling feature of the present invention has not been described in detail. The heating and cooling feature is provided using a thermoelectric device 40, also known as a Peltier device, which makes use of the Peltier effect to transfer heat from one side of the device 40 to the other. Specifically, the thermoelectric device includes a pair of ceramic plates separated by and array of cubes of bismuth telluride or a similar material. When a direct current is applied in a given polarity across the thermoelectric device 40, heat is transferred from one of the ceramic plates (the source) to the other (the sink), cooling the source side and heating the sink side. If the polarity of the current is reversed, the flow of heat is reversed. This reversibility of the direction of heat flow, as well as the compact nature of the device, makes thermoelectric devices ideal for the application to which the present invention is directed. Peltier devices are generally commercially available and well known in the art to which the present invention relates.

A thermoelectric device 40 is disposed on the exterior side of each of the cupholder units 16. While it is possible to use only a single thermoelectric device 40 (on one of the cupholder units), using multiple thermoelectric devices 40 improves the heating and cooling efficiency of the present invention. Each thermoelectric device 40 is provided with a cooling fin or heat sink 42 having a number of fin projections 44 extending therefrom. Cooling fin 42 is preferably formed of aluminum or an aluminum alloy to allow for maximum heat dissipation. The exact configuration of the fin projections 44 is not important to the invention; one possible design choice is illustrated in FIG. 1. Those skilled in the art will recognize that the configuration of the cooling fin 42 and its projections 44 will depend more significantly on the amount of heat dissipation needed and the space constraints within the outer frame 12.

Those skilled in the art will also recognize that a degree of thermal isolation between the cooling fins 42 and the cupholder units 16 will be desirable for greater efficiency of the system. Consequently, insulating foam sections 41 are disposed for this purpose between the cooling fins 42 and the cupholder units 16.

Each thermoelectric device 40 is provided with a direct current power supply (not shown) which is controllable using a switch (also not shown). Ideally the switch will be a three-position switch allowing for activation and deactivation of the devices and selection (during activation) between heating and cooling modes. An optional thermostatic interrupt may be provided to stop the operation of the thermoelectric devices 40 when the container 26 has reached a desired temperature.

Figure 2:
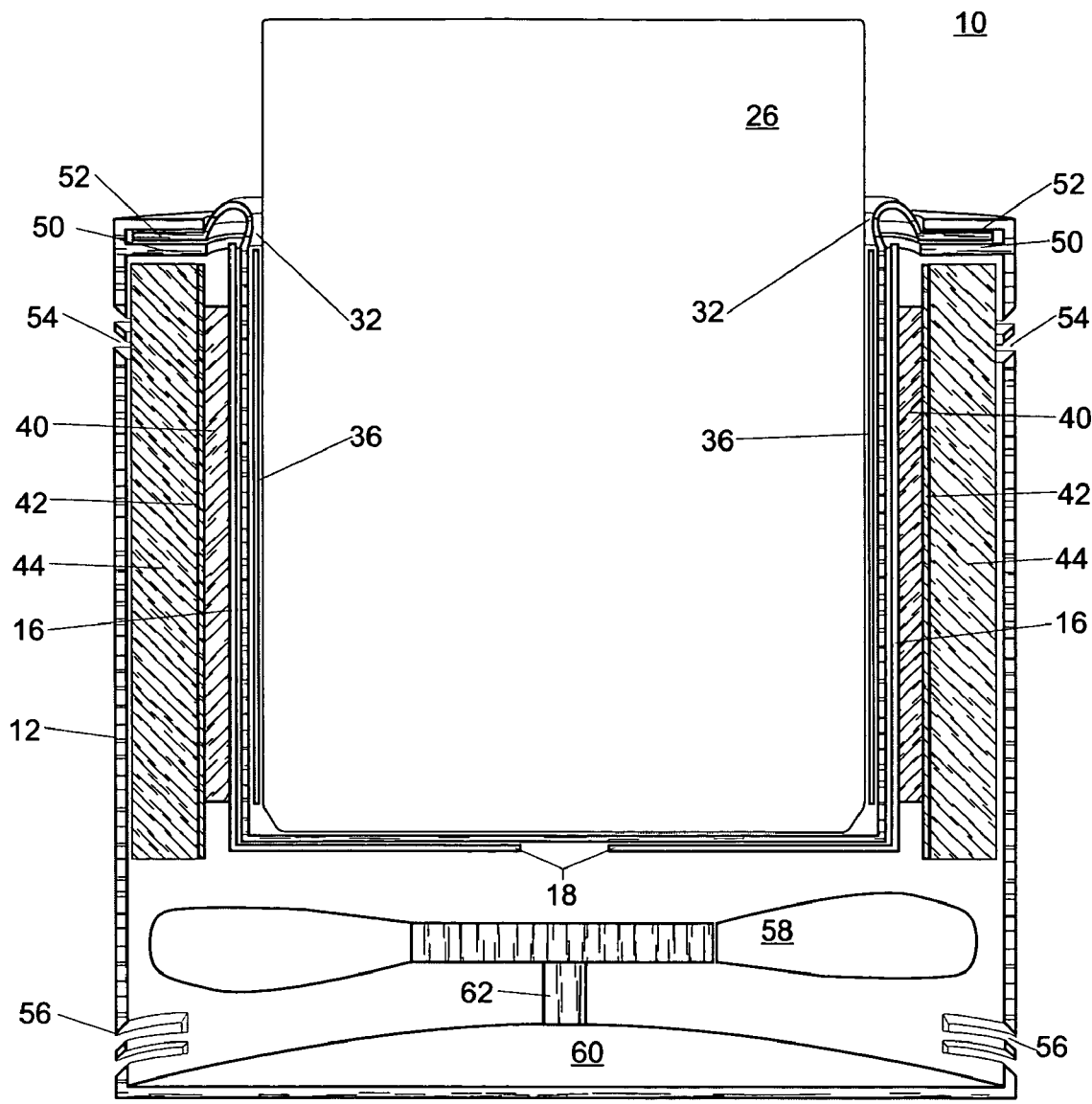
FIG. 2 is a lateral cross-sectional view of a device taken along line 2—2 in FIG. 1.

Referring now to FIG. 2, a device according to the present invention is shown in a lateral view in a cross-section taken along line 2—2 in FIG. 1, with like numbers representing like members. As can be seen in FIG. 2, the outer frame 12 is provided with a slot 50 in the top thereof into which a lip 52 of the liner 32 may be inserted for security purposes. The outer frame 12 is further provided with a set of upper vents 54 for allowing air intake and a set of lower vents 56 for allowing air outflow, for a purpose to be described in greater detail momentarily. As can be seen in FIGS. 1 and 2, in conjunction, the interior of the outer frame 12 is generally open interbetween the upper and lower vents 54,56, such that air may flow generally therebetween. A fan 58 is mounted at the base 60 of the outer frame 12 and is mounted on a shaft 62 which is connected to a motor (not shown). The fan 58 is driveable, using the motor, to incude a ready flow of air between the upper and lower vents 54,56. This flow of air passes over the fins 42, and more specifically the fin projections 44, in order to aid in the dissipation of heat therefrom.

If the direct current is connected across the thermoelectric devices 40 at a given polarity, a device according to the present invention operates to cool the interior space 24 of the cupholder member 18. This is accomplished by the efficient transfer (removal) of heat from the cupholder units 16, which are ideally in a full-face contact with the beverage container 26, via the thermoelectric device 40. This heat is dissipated by the fins 42, aided by air flow generated by the fan 58, which is activated during both the heating and cooling modes. If the polarity of the direct current is reversed, ideally using a switch between electrical circuits having opposite directions, heat is instead directed from the thermoelectric devices 40 into the interior space 24 of the cupholder member 18. As this heating mode of operation serves to heat the interior space 24 at the expense of the finned side of the thermoelectric devices 40, the fan 58 may be activated to draw ambient air into the region of the finned side of the thermoelectric device 40, although a portion of the electrical energy used to operate the thermoelectric devices 40 is converted into heat energy and directed to the interior space 24. The use of thermoelectric devices in the manner indicated allows for an efficiently managed active heat management system for the cupholder 10.

Moreover, the passive features of the cupholder 10, including the split configuration of the cupholder member 18 into cupholder units 16, the expandable folded liner 32, and the pin-in-groove mounting feature 20,22 for the cupholder units 16, create a cupholder wherein various cup 26 sizes and shapes may be contained within the cupholder 10, while good contact between the cupholder member 18 and the cup 26 is maintained.

In view of the aforesaid written description of the present invention, it will be readily understood by those persons skilled in the art that the present invention is susceptible of broad utility and application. Many embodiments and adaptations of the present invention other than those herein described, as well as many variations, modifications, and equivalent arrangements, will be apparent from or reasonably suggested by the present invention and the foregoing description thereof, without departing from the substance or scope of the present invention. Accordingly, while the present invention has been described herein in detail in relation to preferred embodiments, it is to be understood that this disclosure is only illustrative and exemplary of the present invention and is made merely for purposes of providing a full and enabling disclosure of the invention. The foregoing disclosure is not intended nor is to be construed to limit the present invention or otherwise to exclude any such other embodiments, adaptations, variations, modifications and equivalent arrangements, the present invention being limited only by the claims appended hereto and the equivalents thereof.

What is claimed is:

1. A system for retaining and controlling the temperature of a beverage, comprising:
   a generally cylindrical, open-topped heat-conductive cupholder for contacting and supporting the beverage in a container disposed on an interior thereof;
   a heat-conductive liner for providing a substantially continuous containment surface disposed within the cupholder and interposed between the cupholder and the beverage container;
   a thermoelectric device disposed on a vertical exterior side of the cupholder and connected to a power source for powering the thermoelectric device;
   a heat sink contacting the thermoelectric device and thermally insulated from the cupholder; and
   a switch for selectively actuating and deactuating the thermoelectric device to heat or to cool the cupholder.

2. A system according to claim 1, wherein the cupholder comprises a plurality of cupholder units mergeable to form a cylindrical cupholder.

3. A system according to claim 2, wherein each of the cupholder units is mounted to a fame.

4. A system according to claim 3, wherein the cupholder is expandable by separating the cupholder units from each other, and the cupholder units are urged toward merger thereof.

5. A system according to claim 4, wherein the liner is expandable and contractable with the cupholder.

6. A system according to claim 3, wherein each of the cupholder units comprises mounting pins and the frame comprises a set of grooves for receiving the mounting pins.

7. A system according to claim 1, wherein the switch is configured to be disposed in at least an off position, a heating position representing a first polarity of the power source across the thermoelectric device for inducing heating of the cupholder, and a cooling position representing a second polarity opposite the first polarity for inducing cooling of the cupholder.

8. A system according to claim 1, further comprising a fan for drawing air across the heat sink.

9. A system according to claim 1, wherein the switch comprises a thermostat for selectively actuating or deactuating the thermoelectric device according to a temperature of the cupholder.

10. A system according to claim 1, further comprising at least one additional thermoelectric device.

11. A cupholder system for an automobile, comprising:
a frame mounted within a console of the automobile and accessible from a passenger seat within the automobile;
a cupholder mounted within the frame, the cupholder being generally cylindrical and formed of a heat-conductive material and including a heat-conductive liner therein;
at least one thermoelectric device mounted upon and contacting an outside vertical wall of the cupholder, the thermoelectric device being connected to a power supply within the automobile;
a finned heat sink attached to each of the at least one thermoelectric device and disposed about and thermally isolated from the cupholder; and
a switch for selectively actuating the thermoelectric device to alter the temperature of the cupholder to cool or heat a beverage container placed on the interior of said cupholder.

12. A cupholder system according to claim 11, wherein the cupholder is expandable to accommodate beverage containers of different sizes within a selected range and biased into contact with an exterior surface of the beverage container.

13. A cupholder system according to claim 11, further comprising a fan for drawing ambient air across the heat sink through vents in the frame.

14. A cupholder system according to claim 11, further comprising means for removing condensation from an exterior surface of the cupholder.

15. A cupholder system according to claim 14, wherein the means for removing condensation includes a fan and a vent disposed along a bottom portion of the frame.

16. A system for retaining and controlling the temperature of a beverage, comprising:
a generally cylindrical, open-topped heat-conductive cupholder for contacting and supporting the beverage in a container disposed on an interior thereof, the cupholder being mounted to a frame and expandable and contractable to accommodate beverage containers of different sizes while maintaining substantially full-face contact between the cupholder and the beverage container;
a heat-conductive liner disposed win the cupholder and interposed between the cupholder and the beverage container, the liner being expandable and contractable with the cupholder;
a thermoelectric device disposed on a vertical exterior side of the cupholder and connected to a power source for powering the thermoelectric device;
a heat sink contacting the thermoelectric device and thermally insulated from the cupholder;
a switch for selectively actuating and deactuating the thermoelectric device to heat or to cool the beverage according to a selected position of the switch;
a fan for drawing ambient air across the heat sink; and
a plurality of vents within the frame for permitting the ambient air to be introduced into the interior of the frame.

* * * * *